Patented Sept. 4, 1934

1,972,463

UNITED STATES PATENT OFFICE 1,972,463

WELDING

Leo Schlecht, Ludwigshafen - on - the - Rhine, Walter Schubardt, Mannheim, and Franz Duftschmid, Heidelberg, Germany, assignors to I. G. Farbenindustrie Aktiengesellschaft, Frankfort-on-the-Main, Germany No Drawing. Application August 21, 1931, Serial No. 558,636. In Great Britain July 12, 1930

11 Claims. (Cl. 219—8)

The present invention relates to improvements in welding.

Difficulties and troubles are liable to occur in welding due to the fact that difficultly fusible slag and metallic oxides are formed in the liquid metal present in the welding seam during the welding operation which slag and metallic oxides cause the finished welding to become porous and of low mechanical strength. In order to overcome the said difficulties it is the usual practice to employ for welding metals or preparations containing metals which are as free from impurities as possible.

Our present invention is based upon the discovery that particularly good welding results are obtained by uniting the parts to be welded together by means of a metal which has been obtained by the thermal decomposition of the corresponding metal carbonyl. The metals obtained from the carbonyls have the advantage that they become very mobile during the welding operation and as a result thereof any slag and oxides formed are not included within the welded seam, but are carried to the surface of the welding metal so that upon the subsequent working of the surface they are easily removed. As a result thereof welding takes place very uniformly and the welding seams are of high mechanical resistance and of high flexibility.

According to our invention the metallic powders obtained from the corresponding metal carbonyls or mixtures of such powders are employed in mixture with the well known additional constituents of welding mixtures, which are hereinafter briefly and collectively referred to as non-metallic "fluxing agents". As examples of such agents may be mentioned borax, silicates, ammonium chloride and the like which serve mainly for cleaning the metallic surfaces to be welded together and for preventing oxidation during the welding operation.

According to our invention the mixtures of the said metals with the said fluxing agents are sintered in suitable moulds and thereby brought into the form of rods or wires suitable for the welding operation.

Particularly valuable wires for welding purposes are obtained according to the present invention for example in the following manner. A metal powder obtained from the corresponding metal carbonyl, for example iron powder from iron carbonyl, is sintered together with finely divided fluxing agents by means of heat or mechanical pressure or both heat and mechanical pressure, and thus made into a wire without any melting operation. Fluxing agents suitable for this purpose are not only borax, silicates and ammonium chloride but also fluorides such as fluor spar, or silicic acid or boric acid. Particularly valuable results are obtained when employing silicates which may be used in the form of glasses. The amounts of the silicates to be added vary preferably between 0.1 and 2 per cent by weight of the mixture. The silicates may contain in addition to silica, calcium oxide, or aluminium oxide, or manganous oxide, or ferrous or ferric oxide, or soda, potash, magnesia, or lead oxide, or several of these oxides. Natural silicates as for example asbestos, or slags, for example the slags from Siemens-Martin furnaces or any other silicates may also be used. It is as a rule advisable that the slags or other silicates should be free from sulphur and phosphorous.

The rods or wires according to the present invention contain the fluxing agents in a finely dispersed state throughout the material, and in this way the chemical reactions which usually take place in the liquid metal during the welding operation, proceed particularly readily.

The present invention is particularly valuable in connection with welding rods or wires containing metals of the iron group, i. e. iron, nickel and cobalt, obtained from the corresponding metal carbonyls, but use may also be made of other metals prepared from their carbonyls, as for example molybdenum or tungsten.

The metals prepared from the corresponding carbonyls by thermal decomposition often contain small amounts of carbon and it is therefore preferred to employ the said metals for the welding operation after they have been subjected to a preliminary treatment for the removal of carbon, so that for example when welding by means of iron obtained from iron carbonyl only such metal is used as contains less than 0.2 per cent of carbon. The carbon content of the metallic powders may be suitably adjusted before, during or after the moulding by sintering of the metallic powders by a treatment with hydrogen.

The process according to the present invention may also be used for making up alloy wires for welding purposes which may also contain fluxing agents. As metals which are particularly suitable for being alloyed with an iron metal may be mentioned manganese and also chromium, molybdenum, tungsten, copper, nickel, vanadium, titanium, aluminium, and beryllium and also non-metals as for example silicon or carbon may in some cases be used. The aforesaid alloy metals may also be used in the form of reducible compounds such as the metal oxides, which alloy compounds such as the metal oxides, which alloy either during the sintering or during the welding, reducing conditions being employed if necessary. It is possible in such alloys to increase the content in manganese for example to between 15 and 18 per cent and the content in carbon to between 1.4 and 1.6 per cent. For welding highly alloyed steels as for example chromium nickel steels, wires of a suitable composition can be produced with the aid of iron powder from iron carbonyl and nickel powder from nickel carbonyl.

The welded seams produced according to the present invention have much better properties than welding seams which have been prepared in the manner hitherto known with the aid of very pure metals derived from other sources. The extensibility and resistance to mechanical pressure of the welded seams according to the present invention are about as high or even higher than that of the metal which is to be united by the welding operation and thus is much greater than that of welded seams produced with the materials hitherto known in commerce for use for that purpose. Moreover the resistance to bending strain of the welded seam is more than three times that of a welded seam prepared with the known commercial metals hitherto in use for welding.

The following examples will further illustrate how this invention may be carried out in practice, but the invention is not restricted to these examples.

*Example 1*

283 parts, by weight, of iron powder obtained by the thermal decomposition of iron carbonyl and containing 1.25 per cent of carbon and 1.15 per cent of oxygen are mixed with 50 parts, by weight, of iron powder obtained by the thermal decomposition of iron carbonyl and containing 1.13 per cent of carbon and 3.25 per cent of oxygen, and with 2.7 parts, by weight, of powdered manganese dioxide and 1 part, by weight, of powdered calcium aluminium silicate slag. The mixture is sintered at 1200° C. and made into wire 4 millimeters in diameter. The wire contains 0.03 per cent of carbon, 0.5 per cent of manganese and 0.3 per cent of slag which is uniformly and finely distributed throughout the material. The wire is excellently suitable for electric welding.

Wires for welding of the nature described in this example should preferably contain between 0.01 and 0.15 per cent of carbon, between 0.2 and 1 per cent of manganese and between 0.1 and 2 per cent of a fluxing agent such as a silicate.

*Example 2*

100 parts of iron powder, obtained by the thermal decomposition of iron carbonyl, containing 1.22 per cent of carbon and 1.80 per cent of oxygen, are mixed with 1.2 parts of ferromanganese containing 75 per cent of iron, 0.15 part of fluor spar and 0.25 part of calcium silicate and the mixture is subjected to sintering by heating for 4 hours to 1200° C. The resulting sintered rod is rolled and drawn into wire. The wire contains 0.05 per cent of carbon, 0.9 per cent of manganese and about 0.4 per cent of finely divided non-metallic calcium silicate-fluor spar slag which is dispersed throughout the material. The wire is excellently suitable especially for electric welding.

*Example 3*

100 parts of iron powder, containing 1.61 per cent of carbon and 2.0 per cent of oxygen, obtained from iron carbonyl, 1.2 parts of nickel powder obtained from nickel carbonyl, 0.25 part of finely divided calcined sodium silicate and 1 part of pyrolusite are intimately mixed with each other and the mixture is subjected to sintering by heating for 4 hours to 1200° C. and then made into wire. The wire contains 0.01 per cent of carbon, 0.6 per cent of manganese and 1.2 per cent of nickel and also 0.3 per cent of sodium silicate-manganese oxide slag which is finely dispersed throughout the material.

What we claim is:—

1. The process of producing welding metals which comprises sintering an intimate mixture of a metal, obtained by thermal decomposition of the corresponding metal carbonyl, with a non-metallic fluxing agent.

2. Welding metals in the form of a coherent sintered mass comprising a metal obtained by thermal decomposition of the corresponding metal carbonyl, and a non-metallic fluxing agent in a finely dispersed state throughout the mass.

3. Welding metals in the form of a coherent sintered mass comprising a metal of the iron group obtained by thermal decomposition of the corresponding metal carbonyl, and a non-metallic fluxing agent in a finely dispersed state throughout the mass.

4. Welding metals in the form of a coherent sintered mass comprising iron obtained by thermal decomposition of iron carbonyl, and a non-metallic fluxing agent in a finely dispersed state throughout the mass.

5. Welding metals in the form of a coherent sintered mass comprising a metal, obtained by thermal decomposition of the corresponding metal carbonyl, and a silicate in a finely dispersed state throughout the mass.

6. Welding metals in the form of a coherent sintered mass comprising a metal, obtained by thermal decomposition of the corresponding metal carbonyl, and between 0.1 and 2 per cent, by weight of the mass, of a non-metallic fluxing agent in a finely dispersed state throughout the mass.

7. Welding metals in the form of a coherent sintered mass comprising a metal, obtained by thermal decomposition of the corresponding metal carbonyl, and between 0.1 and 2 per cent, by weight of the mass, of a silicate in a finely dispersed state throughout the mass.

8. Welding metals in the form of a coherent sintered mass comprising iron, obtained by thermal decomposition of iron carbonyl, between 0.01 and 0.15 per cent of carbon, between 0.2 and 1 per cent of manganese, and between 0.1 and 2 per cent of a fluxing agent.

9. Welding metals in the form of a coherent sintered mass comprising iron, obtained by thermal decomposition of iron carbonyl, 0.03 per cent of carbon, 0.5 per cent of manganese, and 0.3 per cent of silicate slag.

10. Welding metals in the form of a coherent sintered mass comprising iron, obtained by thermal decomposition of iron carbonyl, 0.05 per cent of carbon, 0.9 per cent of manganese, and about 0.4 per cent of silicate slag.

11. Welding metals in the form of a coherent sintered mass comprising iron, obtained by thermal decomposition of iron carbonyl, 0.01 per cent of carbon, 0.6 per cent of manganese, 1.2 per cent of nickel, and 0.3 per cent of silicate slag.

LEO SCHLECHT.
WALTER SCHUBARDT.
FRANZ DUFTSCHMID.